United States Patent
Ferren et al.

(10) Patent No.: US 11,782,586 B2
(45) Date of Patent: *Oct. 10, 2023

(54) MECHANISM FOR FACILITATING MULTIPLE MULTIMEDIA VIEWING PLANES IN MEDIA DISPLAY SYSTEMS

(71) Applicant: Tahoe Research, Ltd., Dublin (IE)

(72) Inventors: Bran Ferren, Beverly Hills, CA (US); Lakshman Krishnamurthy, Portland, OR (US); Schawn A. Jasmann, Los Angeles, CA (US); David Beal, New York, NY (US); Pablo A. Maurin, Glendale, CA (US)

(73) Assignee: Tahoe Research, Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/527,332

(22) Filed: Oct. 29, 2014

(65) Prior Publication Data

US 2015/0106715 A1    Apr. 16, 2015

Related U.S. Application Data

(63) Continuation of application No. 13/539,228, filed on Jun. 29, 2012, now Pat. No. 8,893,184.

(Continued)

(51) Int. Cl.
*G06F 3/04842* (2022.01)
*H04N 21/422* (2011.01)
(Continued)

(52) U.S. Cl.
CPC ........ *G06F 3/04842* (2013.01); *G06F 3/0481* (2013.01); *G06F 9/451* (2018.02); *G06F 13/00* (2013.01); *G06F 16/4393* (2019.01); *G06F 16/71* (2019.01); *G06F 16/738* (2019.01); *H04N 21/42209* (2013.01); *H04N 21/4312* (2013.01);
(Continued)

(58) Field of Classification Search
CPC ...... G06F 3/0481; G06F 3/0482; G06F 9/451; G06F 16/738; G06F 16/4393; G06F 16/71; G06F 13/00; H04N 21/47; H04N 21/482; H04N 21/478; H04N 21/4821; H04N 21/6125; H04N 21/448; H04N 21/488;
(Continued)

(56) References Cited

U.S. PATENT DOCUMENTS 6,799,327 B1 * 9/2004 Reynolds ............... H04N 21/47
                                                725/60
6,910,191 B2   6/2005 Segerberg et al.
(Continued)

*Primary Examiner* — Wilson W Tsui
(74) *Attorney, Agent, or Firm* — Studebaker & Brackett PC

(57) ABSTRACT

A mechanism is described for facilitating multiple multimedia viewing planes in media display systems according to one embodiment of the invention. A method of embodiments of the invention includes using a plurality of multimedia planes corresponding to a plurality of multimedia content types. The plurality of multimedia planes may be integrated to be presented through an integrated user interface at a media processing device. The method may further include selecting, via the integrated user interface, one or more content categories from a plurality of multimedia content categories, and presenting, via a multimedia plane of the plurality of multimedia planes, contents associated with the one or more selected content categories.

20 Claims, 13 Drawing Sheets

US 11,782,586 B2
Page 2

Related U.S. Application Data

(60) Provisional application No. 61/508,375, filed on Jul. 15, 2011.

(51) Int. Cl.
  *H04N 21/431* (2011.01)
  *G06F 9/451* (2018.01)
  *G06F 16/738* (2019.01)
  *G06F 16/438* (2019.01)
  *G06F 16/71* (2019.01)
  *G06F 13/00* (2006.01)
  *G06F 3/0481* (2022.01)

(52) U.S. Cl.
  CPC ..... *H04N 21/4314* (2013.01); *H04N 21/4316* (2013.01)

(58) Field of Classification Search
  CPC ......... H04N 21/42209; H04N 21/4312; H04N 21/46316; H04N 21/4314
  See application file for complete search history.

(56) References Cited

U.S. PATENT DOCUMENTS

| | | | |
|---|---|---|---|
| 6,990,676 B1* | 1/2006 | Proehl | H04N 21/4622 725/51 |
| 8,913,192 B2* | 12/2014 | Karaoguz | H04N 21/47 725/38 |
| 10,341,702 B1* | 7/2019 | Chaudhry | H04N 21/47202 |
| 2003/0052923 A1* | 3/2003 | Porter | G09G 5/14 715/790 |
| 2006/0069987 A1* | 3/2006 | Jones | G06F 3/0482 715/246 |
| 2006/0236328 A1* | 10/2006 | DeWitt | G06F 9/4445 719/329 |
| 2008/0235731 A1* | 9/2008 | Bryant | H04N 21/4751 725/44 |
| 2009/0070673 A1* | 3/2009 | Barkan | H04N 5/44513 715/716 |
| 2009/0157697 A1* | 6/2009 | Conway | H04N 7/00 709/219 |
| 2009/0222757 A1* | 9/2009 | Gupta | H04N 21/4781 715/776 |
| 2010/0031153 A1* | 2/2010 | Ortwein | G06F 9/542 715/733 |
| 2010/0131983 A1* | 5/2010 | Shannon | H04N 5/44543 725/46 |
| 2010/0333135 A1 | 12/2010 | Lau et al. | |
| 2011/0047513 A1* | 2/2011 | Onogi | H04N 21/47 715/838 |
| 2011/0047568 A1* | 2/2011 | Yeh | H04N 21/6125 725/38 |
| 2011/0225502 A1* | 9/2011 | BlahaErath | G06F 16/9577 709/224 |
| 2011/0258656 A1 | 10/2011 | Michel | |
| 2011/0258661 A1 | 10/2011 | Knudson et al. | |
| 2012/0030616 A1* | 2/2012 | Howes | G06F 3/0481 715/800 |
| 2012/0117601 A1* | 5/2012 | Yeh | H04N 21/4316 725/42 |
| 2012/0166177 A1* | 6/2012 | Beld | G06F 17/27 704/9 |
| 2013/0179925 A1* | 7/2013 | Woods | H04N 21/4222 725/51 |

* cited by examiner

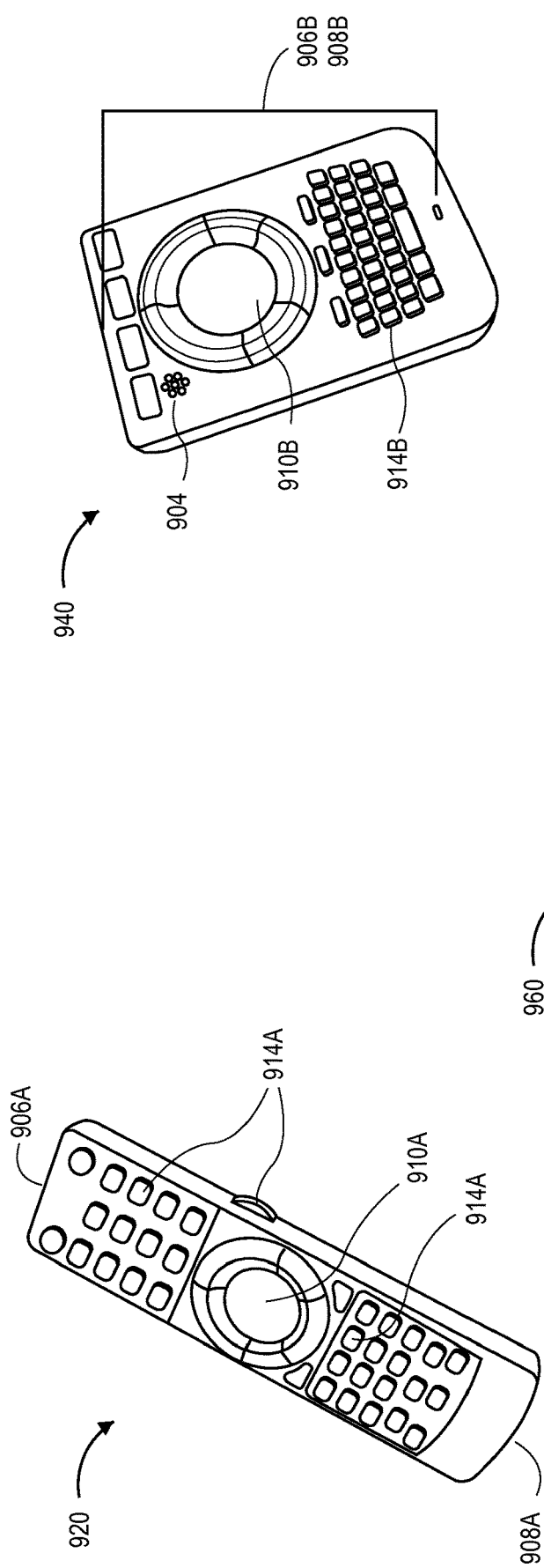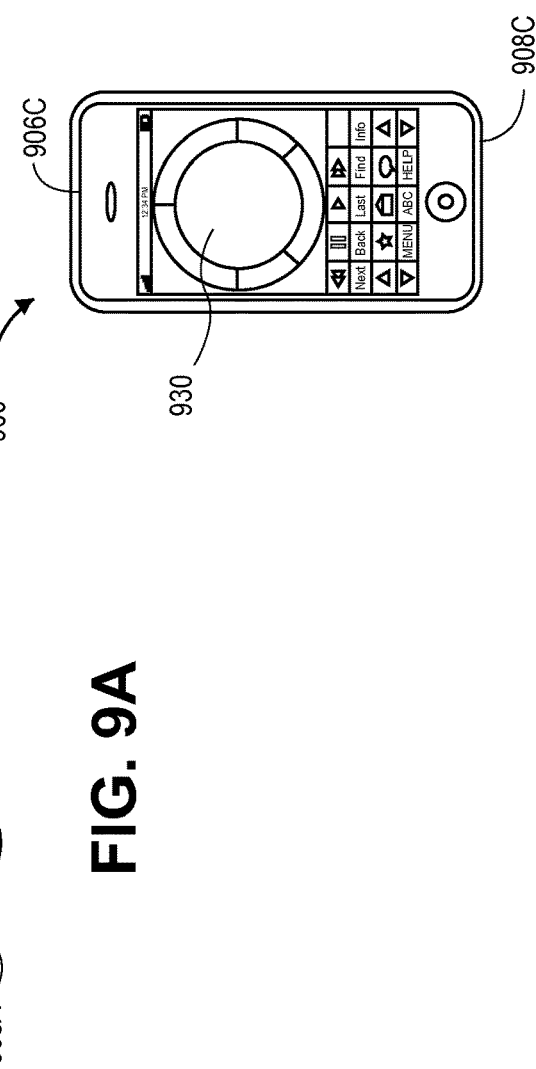
FIG. 9B
FIG. 9C
FIG. 9A

MECHANISM FOR FACILITATING MULTIPLE MULTIMEDIA VIEWING PLANES IN MEDIA DISPLAY SYSTEMS

RELATED APPLICATIONS AND CLAIM OF PRIORITY

This application is a continuation application that claims the benefit of and priority to U.S. patent application Ser. No. 13/539,228, entitled "MECHANISM FOR FACILITATING MULTIPLE MULTIMEDIA VIEWING PLANES IN MEDIA DISPLAY SYSTEMS", by Bran Ferren, et al., filed Jun. 29, 2012, now allowed, which claims the benefit of and priority to U.S. Provisional Patent Application Ser. No. 61/508,375, by Bran Ferren, et al., filed Jul. 15, 2011, the entire contents of which are incorporated herein by reference.

FIELD

Embodiments of the invention relate to media systems. More particularly, embodiments of the invention relate to a mechanism for facilitating multiple multimedia viewing planes in media display systems.

BACKGROUND

With the growing use of multimedia, multimedia devices (e.g., televisions, computing devices, etc.) are expected to adopt new convenient features and services to keep up with the growth. However, current entertainment systems require a user to access, for example, television media, the internet, and personal media using three separate interfaces. Additionally, menus used in each of these systems typically are intrusive and not very accommodating of other media. For example, when a user views a menu on a television or computer display, the menu typically covers the entire display, blocking the multimedia stream. Other times, the menu covers a portion, such as the bottom part, of the current multimedia stream without regard for what is being presented in that portion of the display. Additionally, such menus are complex, poorly organized, and provide little information. For example, it is cumbersome and time-consuming to go through a series of dates or channels, etc., to search a particular program or genre.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 9A, 9B, 9C and 9D illustrate embodiments of remote controls that are configured to be used with an integrated navigation system.

DETAILED DESCRIPTION

In the following description, numerous specific details are set forth. However, embodiments of the invention may be practiced without these specific details. In other instances, well-known circuits, structures and techniques have not been shown in details in order not to obscure the understanding of this description.

Embodiments of the invention provide a mechanism for facilitating integration of multiple multimedia viewing planes in media display systems. In one embodiment, an integrated on-screen media navigation system ("integrated navigation system") is provided as having multiple viewing planes that serve as a unified access point for various media, such as television programming, personal media, and the Internet. The integrated navigation system may provide integration of multiple media planes such that they are graphically readable and usable as well as aesthetically pleasing. Further, the integrated navigation system allows the user to perform complex interactions intuitively and easily.

Embodiments provide for integrated television-viewing, media-perusing, and/or web-browsing for a user of such services. For example and in one embodiment, these aforementioned features may be arranged together to provide the user a unified interface through the integrated navigation system to freely navigate through television, media, and the Internet. In one embodiment, the unified interface represents and integrates the information (e.g., television programming, websites, etc.) provided by a range of devices and services into the existing television or other display in a functionally seamless and easily understood manner.

Figure 1:
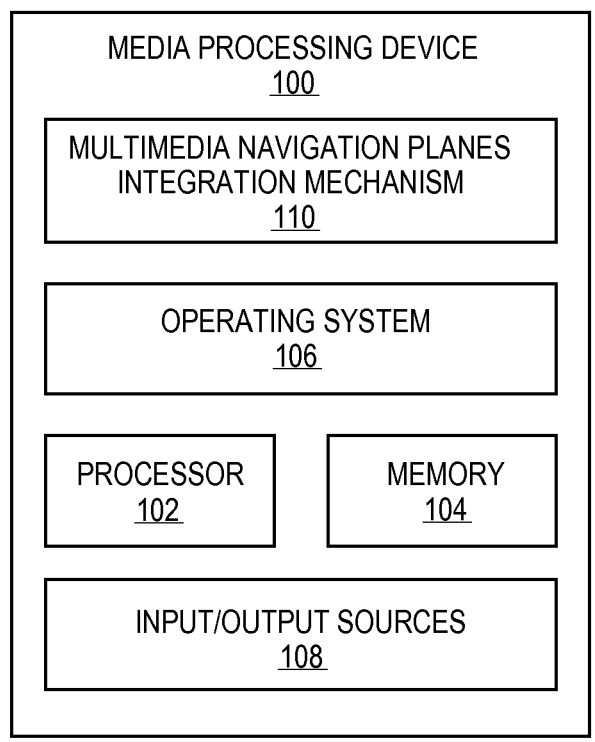
FIG. 1 illustrates an embodiment of a media processing device.

FIG. 1 illustrates an embodiment of a media processing device 100. Media processing device 100 includes a host multimedia system that used to perform media processing operations to receive, process, and display multimedia content via an output device, such as a display screen. It is contemplated that embodiments are not limited to the illustrated media processing device 100 or its particular topology and that an alternate topology may be implemented in any given embodiment. Media processing device 100 may be coupled to one or more media sources (e.g., a cable broadcasting headend, a digital versatile/video disc (DVD) player, websites/the Internet, home media servers, storage media (e.g., hard drives) to receive media content, one or more input devices (e.g., a keyboard, a mouse, a remote control, a touchpad, etc.), and one or more output devices (e.g., display devices, etc.).

Media processing device 100 may the same as or include one or more components of a computing device (such as computing system 1100 of FIG. 11) having a mechanism for facilitating integration of multiple multimedia viewing/display navigation planes 110 (also referred to as "integration mechanism"). Media processing device 100 may be provided by or reside within any one or more of, but not limited to, television sets, television set-top boxes (e.g., Internet-based set-top boxes, etc.), etc. Media processing device 100 may further include mobile computing devices, such as cellular phones including smartphones (e.g., iPhone®, BlackBerry®, etc.), other phones (e.g., landlines), handheld computing devices, personal digital assistants (PDAs), etc., tablet computers (e.g., iPad®, Samsung® Galaxy Tab®, etc.), laptop computers (e.g., notebook, netbook, Ultrabook™, etc.), e-readers (e.g., Kindle®, Nook®, etc.), etc. Media processing device 100 may further reside within larger computing devices, such as desktop computers, server computers, etc.

Media processing device 100 includes an operating system 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "media processing device", "media processing system", "computing device", "node", "computing node", "client", "memory client", "host", "server", "memory server", "machine", "device", "computing device", "computer", "computing system", and the like, may be used interchangeably and synonymously throughout this document.

In various embodiments, various elements of the media processing device 100 may communicate, manage, process, and/or display media and other relevant information with one or more of any number and type of protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, etc. Another example may include Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, media processing device 100 may be implemented as a wired communication system, a wireless communication system, or a combination thereof. Although media processing device 100 may be illustrated using a particular communications media by way of example, it may be appreciated that the principles and techniques discussed herein may be implemented using any type of communication media and accompanying technology.

Figure 2:
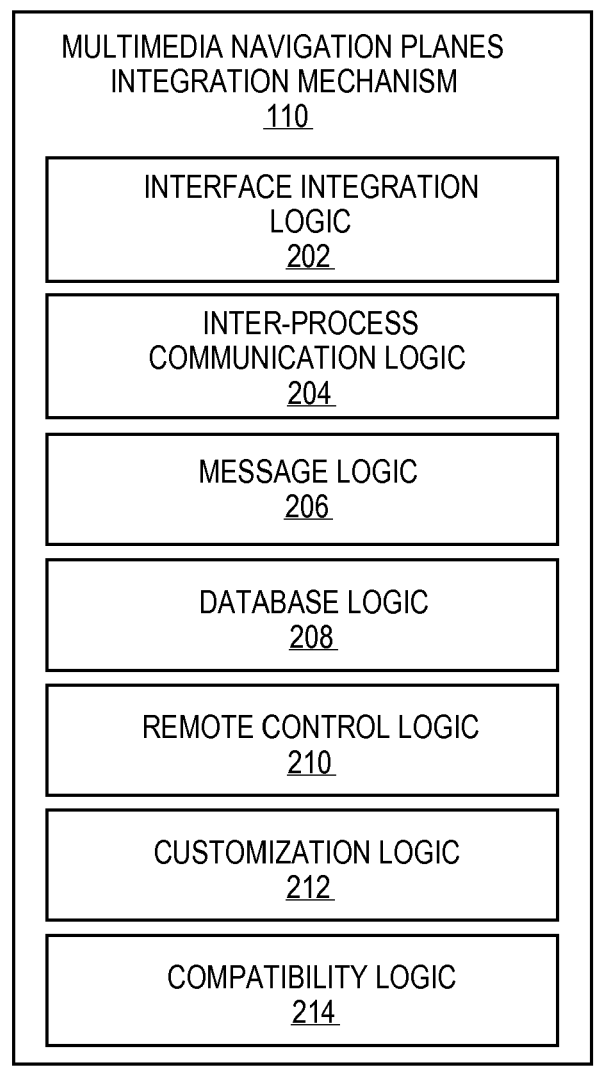
FIG. 2 illustrates an embodiment of a multimedia viewing planes integration mechanism.

FIG. 2 illustrates an embodiment of an integration mechanism 110. In one embodiment, integration mechanism 110 includes any number of components (also referred to as "logic" and "modules"), such as interface integration logic 202, inter-process communication logic 204, message logic 206, database logic 208, remote control logic 210, customization logic 212, and compatibility logic 214. "Logic" (and similarly, "component" and "module") may refer to hardware, software, firmware, and any combination thereof. The illustrated components 202-214 and their functionalities are further described with reference to the subsequent figures of this document.

Figure 4:
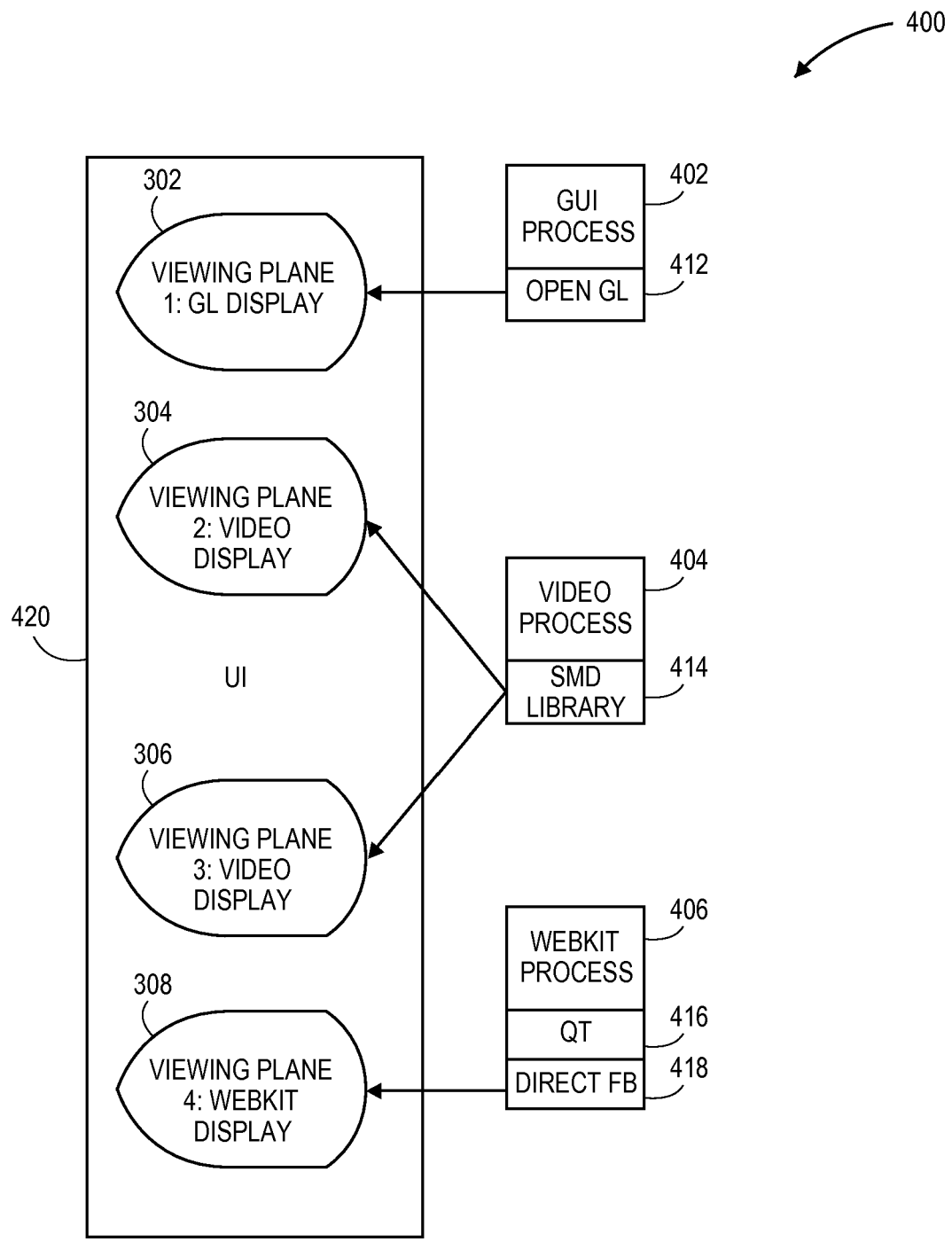
FIG. 4 illustrates an embodiment of a schematic representation of various processes of multiple multimedia planes integrated into an integrated navigation system.
Figure 5:
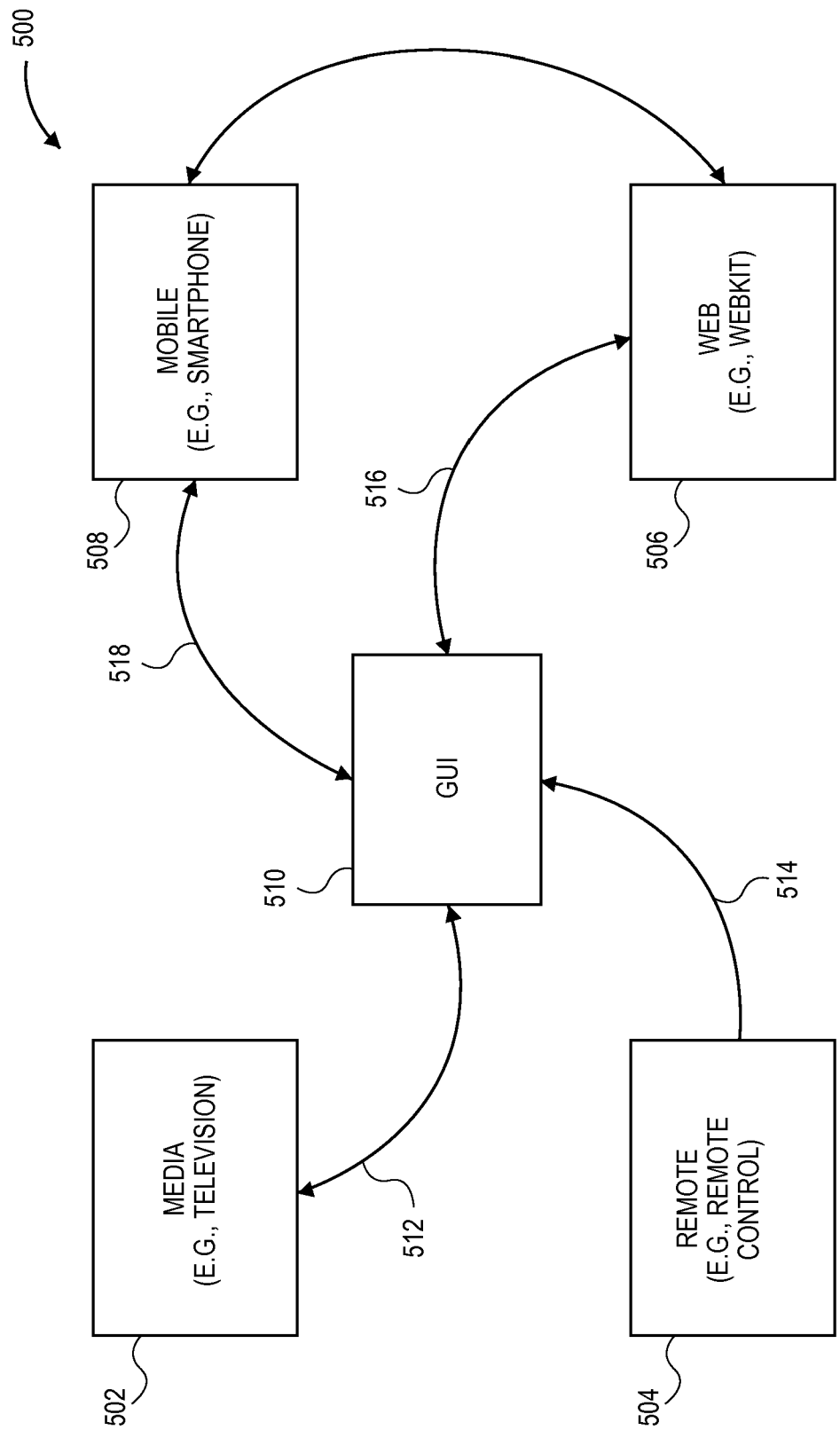
FIG. 5 illustrates an embodiment of an inter-process communication channels network of various multimedia sources of input to Graphical User Interface.
Figure 6:
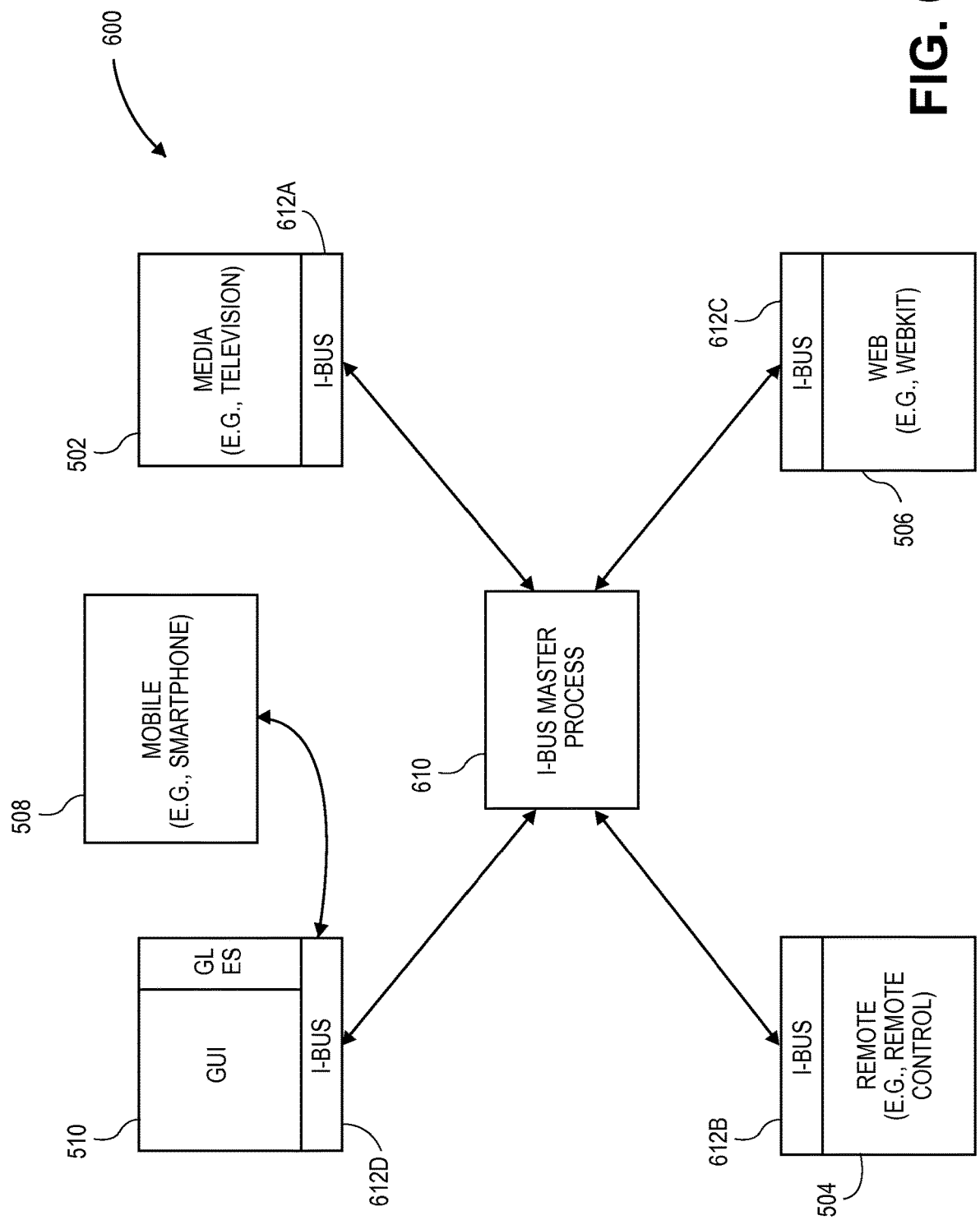
FIG. 6 illustrates an embodiment of a message routing system for facilitating an integrated navigation system.
Figure 7:
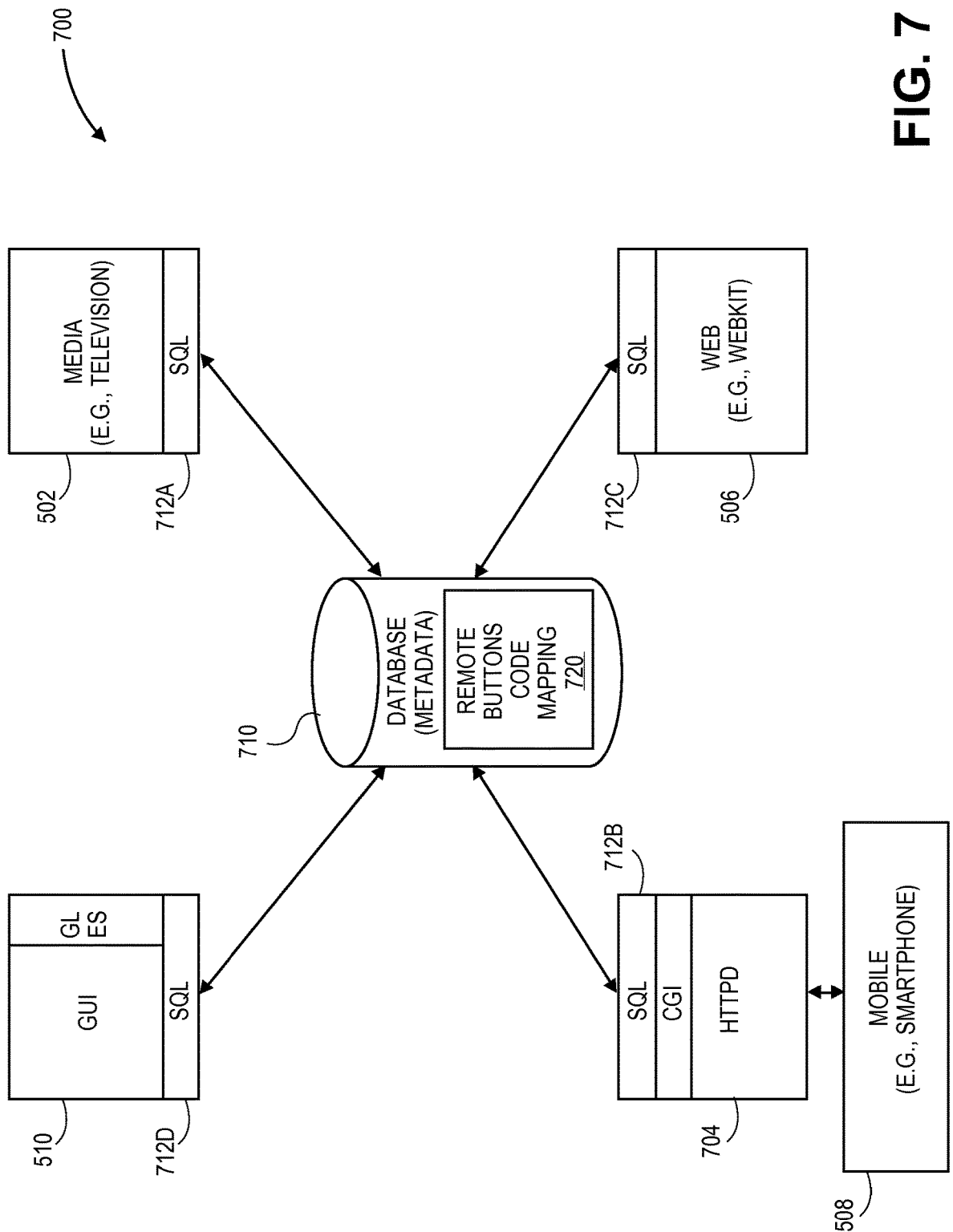
FIG. 7 illustrates a database architecture for facilitating an integrated navigation system.

In one embodiment, (1) interface integration logic 202 may facilitate an integrated user interface (such as the integrated user interface 420 of FIG. 4), (2) inter-process communication logic 204 may facilitate a communication network 500 of communication channels 512-518 between various processes and their corresponding media renderers 502-508 as shown with regard to FIG. 5, (3) message logic 206 may facilitate using of a message routing system, such as the message routing system 600 of FIG. 6, (4) database logic 208 may facilitate implementation and use of a database architecture, such as the database architecture 700 of FIG. 7, (5) remote control logic 210 may facilitate uses of various types of remote controls, such as remote controls 920, 940, 960 of FIGS. 9A-9C, within the integrated navigation system, (6) customization logic 212 may allow users to change various viewing or user profile settings, such as changing a user profile, placing locks on certain programming, moving various items of the display screen to receive multimedia within a particular setup (e.g., television media stream to occupy 60% of display screen and placed at the upper top corner, etc.), changing other items, such as display colors, turning on and off of closed caption, changing the language (e.g., English, Spanish, etc.), and (7) compatibility logic 214 may facilitate compatibility between the integrated navigation system and various changing technologies (e.g., topology, communication protocols, etc.) and devices (e.g., tablet computers, remote controls, etc.), and the like.

It is contemplated that any number and type of components may be added to and/or removed from integration mechanism 110 to facilitate various embodiments of the invention including adding, removing, and/or enhancing certain features. For example, integration mechanism 110 may further include a display navigation component (not shown) that works with other components, such as interface integration logic 202 and inter-process communication logic 204, as will be further described with reference to FIGS. 3A and 3B. The dynamic dual ribbon matrix GUI view may allow a user to select a media object with minimal disruption to the multimedia stream presented on other portions of the GUI view and, in one embodiment, the multimedia stream may be one or more of a television program, a movie, a computer game, a video game, a photograph, a home video, or the like. The dynamic dual ribbon matrix GUI view may be implemented as a two-dimensional (X-Y) matrix such that one axis (e.g., Y-axis) may list one or more categories, while the other axis (X-axis) may list media objects associated with each of the categories.

The display navigation component may further include category presentation component (not shown) to, for example, determine and present various categories listed in a vertical (axis) column of the matrix of multimedia panels (using text, icon, etc.) so that a user may select a category from the category ribbon. Examples of such categories may include, but are not limited to, movies, sports, shopping, people, favorites, favorite channel, etc. The display navigation component may further include a media object presentation component (not shown) to determine and present one or more objects associated with each category and these media objects may be presented based on, for example, a personalized entertainment channel. Such media objects may be presented as titles, thumbnail images, live videos, etc., in a second ribbon, such as in a horizontal row (or axis), of the matrix and may include, but are not limited to, movies, photographs, video games, computer games, home videos, songs, audio recordings, websites, network locations, television programs, etc.

Figure 3A:
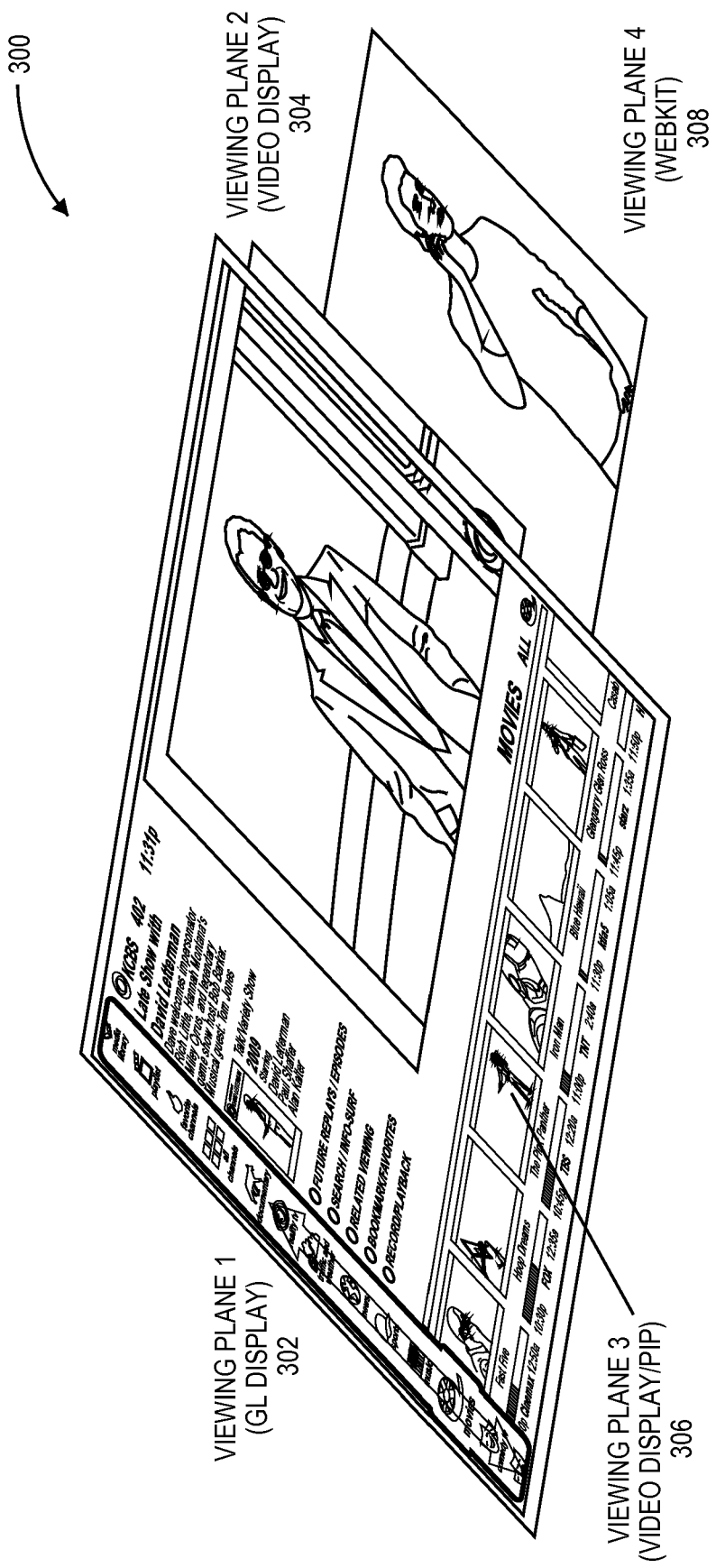
FIG. 3A illustrates an embodiment of an integrated navigation system setup using integrated multimedia viewing planes.

The display navigation component may further include an information panel and action menu presentation component (as shown in FIG. 3A) to, for example, determine and present information and action items based on either a current multimedia stream and/or a selected media object, etc. In one embodiment, these information items may include, but are not limited to, titles, summaries, channel numbers, release dates, directors, writers, producers, actors, etc., while action items may include, but are not limited to, future replays/episodes, searches/info-surfs, related viewings, bookmarks/favorites, records/playbacks, etc. It is contemplated that embodiments of the invention are not limited to any particular device, technology, topology, system, architecture, and/or standard and are dynamic enough to adopt and adapt to any future changes.

FIG. 3A illustrates an embodiment of a layout 300 of integrated multimedia viewing planes 302-308. In the illustrated embodiment, template or layout 300 provides four viewing planes 302-308 that are integrated by merging their corresponding interfaces into an integrated user interface, via the interface integration logic 202 of FIG. 2, and further by linking their corresponding processes through the inter-process communication logic 204 of FIG. 2. For example and in one embodiment, a first process is responsible for main interface elements represented in the user interface and is illustrated as multimedia viewing plane 1 302 (e.g., Graphics Library (GL) or OpenGL® display-based viewing plane), while a second process is used for rendering multiple video streams on two separate multimedia viewing planes, such as viewing plane 2 304 (e.g., video display) and viewing plane 3 (e.g., video display, Picture-in-Picture (PIP)) 306. A third process is used for rendering the web content on a forth multimedia viewing plane 4 308 (e.g., web browser display using WebKit that serves as a layout engine to allow web browsers or render web pages).

It is contemplated that embodiments are not limited or confined to the layout 300 and that any number and type of other layouts or templates may be implemented, such that there can any number or type of planes including any number or type of television programming display planes, web browser display planes, video display planes, or the like.

Figure 3B:
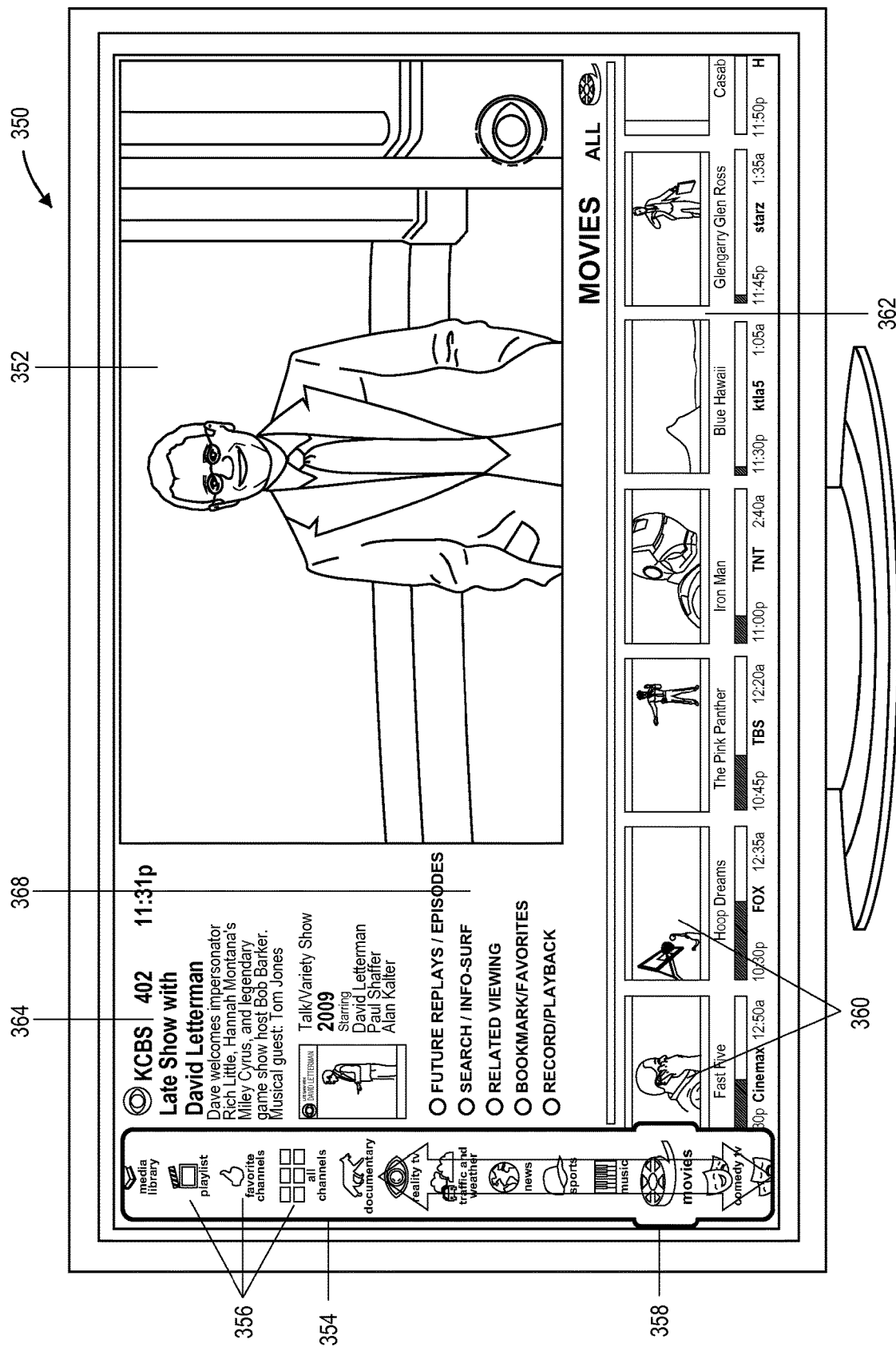
FIG. 3B illustrates an embodiment of a dynamic dual ribbon matrix Graphical User Interface view of an integrated navigation system.

FIG. 3B illustrates an embodiment of a dynamic dual ribbon matrix GUI view 350 of an integrated navigation system. In one embodiment, the illustrated GUI view 350 is for an end user who may be enjoying multimedia content, such as one or more media streams (e.g., a television program, a website, an audio stream, etc.). In the illustrated embodiment, media stream 352 (e.g., a television program stream) can be adjusted by the user to any size from covering the entire display screen to only a small part of the display screen, such as the upper right corner, the bottom left corner, the center, etc. Further, media stream 352 may be provided with better than any conventional visibility and design proportions.

In one embodiment, a category ribbon 354 may be used to present or display one or more categories 356 in a user-friendly design, such as left-to-right, top-to-bottom, etc. The category ribbon 354 is shown as a user-friendly vertical ribbon, but it is contemplated that it could be adjusted to be displayed as a horizontal ribbon and may include any number of categories 356, such as from one category covering the entire ribbon to any number of categories. Further, the category ribbon 354 may be scrolled-up, scrolled-down, sideways, etc. The category ribbon 354 may include an active category slot 358 that refers to as an active category to determine the available media objects 360 in the media objet ribbon 362.

In one embodiment, the user may indicate the selection via one or more of input devices, such as, but not limited to, a remote control (such as via remote control logic 210 of FIG. 2), a keyboard, a control pad, a touch sensitive device, a gesture recognition system, etc. For example, the user may point a finger in a horizontal motion to begin scrolling the category ribbon 354 and, for example, the user may place all fingers and palm towards the electronic display to stop the scrolling. Other user gestures may be implemented, as desired or necessitated.

Furthermore, in one embodiment, an information panel 364 and an action menu 368 may be presented and displayed on the GUI view 350 and that the information panel 364, the action menu 368, the category ribbon 354, the media object ribbon 362, etc., may be presented and displayed simultaneously. In one embodiment, information panel 364 and action menu 368, and the like, may be setup to be user-friendly and follow good design rules; however, it is contemplated that that information panel 364 and action menu 368 may be placed differently, such as information panel 364 may be presented and displayed on the right (or left) of the category ribbon 354, while action menu 368 may be presented and displayed immediately above (or below) the information panel 364, and the like, leaving ample room for the multimedia stream 352. The multimedia stream 352 may include a television program or a DVD-based movie, the information panel 364 may include a station name/symbol/logo/icon, a channel name/symbol/logo/icon, the program time or the current time, the program name or poster, etc., the action menu 368 may include play, replay, search, scan, bookmark, forward, rewind, record, playback, pause, etc. As illustrated in FIG. 3B, the media objects 360 in the media object ribbon 362 may include a media content preview pane 370 (e.g., of a television program or movie). The media objects 360 may further include one or more of a media content source identifier 372 (e.g., a station name/symbol/logo/icon or a channel name/symbol/logo/icon), a media content program time 374 (e.g., a time indication associated with the start and/or end of a television program or movie), a media content program progress indicator 376 (e.g., an indication of elapsed content for programs already in progress), and/or a media content program name 378 (e.g., a television program or movie name/symbol/logo/icon).

FIG. 4 illustrates an embodiment of a schematic representation 400 of various processes 402-406 of multiple multimedia planes 302-308. As described with reference to FIG. 3A, this schematic representation 400 provides an integration of a number of processes 402-406 that are used to generate corresponding multimedia viewing planes 302-308 that are then composited into the integrated navigation system and provided via an integrated user interface (UI) 420. Further, a video display controller (VDC) (e.g., Intel® CE 3100 VDC) may serve as a media processor and final device in the chain to generate an appropriate signal for the display based on various operations (including merging) that may have happened upstream, such as certain elements within the VDC generate windows/layers and provide the composited video signal.

In the illustrated embodiment, utilizing a combination of multiple viewing planes 302-308 allows for building a high-performance UI 420 with dynamic and interactive graphics. For example, the first process may be a GUI process 402 utilizing any combination of graphics and relevant application programming interface (API) standards, such as OpenGL, OpenGL ES, etc., for a robust rendering of graphics (e.g., 2D graphics, 3D graphics, etc.) using the first viewing plane 302 via the user interface 420.

In one embodiment, viewing planes 304 and 306 are video displays generated through one or more video-related processes 404 and various relevant components, standards and/or formats 414 (such as video rendering modules, SMD library) and provided to the user through the integrated UI 420. For example, using a high-speed Moving Picture Experts Group (MPEG) decoder (such as the one part of Intel's CE3100 system) may use multiple planes 302-308. For example, having an MPEG decoder located in the hardware may render the video to its own video display viewing plane, such as viewing plane 304, which is used separately from the graphics viewing plane 302. The second video display represented as the third viewing plane 306 may offer a PIP preview functionality anywhere within the integrated UI 420. Using this novel technique, for example, as the user scrolls viewable content along a horizontal ribbon of available programming X-axis, he/she can simultaneously view a live-action video feed (as opposed to merely looking at static images found on channel guides).

In one embodiment and as with the first three viewing planes 302-306, the forth viewing plane 308 is generated to give the user, via the integrated UI 420, access to web browsers to facilitate displaying of and interacting with web content. For example, the fourth viewing plane 308 may be generated and maintained through one or more web-related processes 406, such as WebKit or QtWebKit 416 that serves as an open source web browser engine, and other relevant components, formats, and standards, such as Direct Frame Buffer (Direct FB) 418, etc. For example, QtWebKit 416 may be embedded with direct FB 418 for its back-end rendering (such as used as an abstraction layer for rendering the web content). For example, direct FB 418 may be used if Qt graphics drivers are not available for OpenGL ES 412. It is contemplated that embodiments are not limited to this particular illustration or layout and that other components, settings, formats, and layouts may be used. For example, any number of other options may be used for rendering web content (e.g., Headless Mozilla, etc.) through viewing plane 308 as provided via the integrated UI 420.

FIG. 5 illustrates an embodiment of an inter-process communication channels network 500 of various multimedia processes 502-508 to GUI 510 for facilitating an integrated navigation system. As aforementioned, the integrated UI 420 provides a user experience that is a coordination of multiple multimedia viewing planes 302-308 generated by their corresponding separate processes 402-406 as described with reference to FIG. 4. In one embodiment and as illustrated here, using inter-process communication logic 204 of FIG. 2, a coordinated effort is facilitated to provide multi-directional communication between various multimedia processes 502-508 via multiple communication channels 512-518. In one embodiment, multimedia sources or processes 502-508 may include a number of associated processes, such as processes 402, 404, 406 of FIG. 4, that generate the corresponding viewing planes, such as viewing planes 302, 304-306, 308, of FIG. 4. For example, media process 502 may include video process 404 of FIG. 4, while web process 506 may include WebKit process 406 of FIG. 4, etc. Similarly, GUI process 510 may include GUI process 402, etc. In one embodiment, each multimedia process 502-508 may include an input source or device that, as illustrated here, may serve as a source of content input to GUI 510.

In one embodiment, given a user is expected to interact primarily though the integrated UI (regardless of the media content that is being accessed), the core or the central process of the communication channel network 500 lies within and is represented by GUI 510. As illustrated, GUI 510 (e.g., a GUI software application), being the main access point for users of the integrated navigation system, remains in communication with media processes 502-508 via their corresponding communication channels 512-518. For example, remote process 504 (such as a television remote control, etc.) serving as a remote input source communicates with GUI 510 through communication channel 514, mobile process 508 (including a mobile computing device, such as a smartphone, a tablet computer, a laptop computer, etc.) serving as a mobile input source communicates with GUI 510 through communication channel 518, web process 506 (including a web content generator and/or renderer, such as a web engine, such as QtWebKit, etc.) serving as a web process or input source communicates with GUI 510 via communication channel 516, and media process 502 (such as one or more items represented by and within the integrated UI 420 of FIG. 4 including, but not limited to, a television, a radio, a television broadcasting company, a cable or satellite content provider, a cable set-top box, a radio station, a DVD player, a compact disc (CD) player, etc.) serving as a media process or input source communicates with GUI 510 through communication channel 512.

In one embodiment and as previously described with reference to media processing device 100 of FIG. 1, communication channels 512-518, may be implemented wired or wirelessly or in a combination thereof. For example, when implemented as a wired system, communication channels 512-518 may include one or more elements arranged to communicate information over one or more wired communications media. Examples of wired communications media may include a wire, a cable, a printed circuit board (PCB), a backplane, a switch fabric, a semiconductor material, a twisted-pair wire, a co-axial cable, fiber optics, and the like. Further, the wired communications media may be connected to a device using an input/output adapter through, for example, I/O sources 108 of FIG. 1. The I/O adapter may be arranged to operate with any suitable technique for controlling information signals between elements using a desired set of communications protocols, services or operating procedures and may further include appropriate physical connectors to connect the I/O adapter with a corresponding communications medium. Examples of an I/O adapter may include a network interface, a network interface card (NIC), Universal Serial Bus (USB), IEEE-1393, RS-232, RS-422, or the like.

When implemented as a wireless system, in one embodiment, communication channels 512-518 may include one or more wireless elements arranged to communicate information over one or more types of wireless communication media. An example of wireless communication media may include portions of a wireless spectrum, such as the radio frequency (RF) spectrum. The wireless elements may include components and interfaces suitable for communicating information signals over the designated wireless spectrum, such as one or more antennas, wireless transmitters, receivers, transmitters/receivers ("transceivers"), amplifiers, filters, control logic, antennas, and the like.

In one embodiment, one or more communication components may be used at the media processing device 100 of FIG. 1 (and as discussed with reference to FIG. 10) to be used to execute various communications operations or logic and implement any number and type of communications techniques and protocols, such as techniques suitable for use with packet-switched networks (e.g., public networks such as the Internet, private networks such as an enterprise intranet, and the like), circuit-switched networks (e.g., the public switched telephone network), or a combination of packet-switched networks and circuit-switched networks (with suitable gateways and translators). The communications components may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth.

FIG. 6 illustrates an embodiment of a message routing system 600 for facilitating an integrated navigation system. In one embodiment, via message logic 206 of FIG. 2, a message bus (e.g., I-bus, enterprise service bus (ESB), etc.) mechanism is implemented as a messaging architecture model to be responsible for routing of messages throughout the integrated navigation system by, for example, facilitating the interaction and communication between mutually interactive multimedia processes 502-510 of the integrated navigation system. In one embodiment and as illustrated, a message bus master process 610 is used for maintaining global state of the integrated UI 420 of FIG. 4. For example, messages may be sent and received via any number of Internet and/or messaging protocols, such as the User Datagram Protocol (UDP), with each process 502-510 opening and communicating through a corresponding port, such as a UDP listening port. Alternatively, each process 502-510 may open the same port and work to avoid any conflicting actions based on their awareness of the overall system.

For example, a user is watching television and presses a down-key on a remote control while navigating the integrated UI, the remote process 504 may build a down-key message associated with the down-key operation and communicates the message to, for example, the I-bus master process 610 via its local I-bus 612B. Now, because the master process 610 is aware of the current navigation state within the integrated navigation system, the down-key message is routed directly to the integrated UI, such as the integrated UI 420 of FIG. 4, so that appropriate actions (e.g., go channel down, go to one item down on the menu, etc.) may be taken within the integrated navigation system.

In another example, the user is now surfing the Internet and presses the down-key on the remote control. In this case, the remote process 504 generates a down-key message (which has a different function or functionality in the web-mode as opposed to the television mode) and sends it to the I-bus message process 610 via its local I-bus 612B. Now, since the message process 610 knows the current state is the web-surfing or Internet state, this newly-generated down-key message is forwarded directly to the web browser process 606 (e.g., WebKit), via its local I-bus 612C, to perform a web-based down-key function, such as move down the content of an Internet-based article, etc. Such messages may be generated and appropriately forwarded by each process 502-510 via its corresponding I-bus 612A-612D and the I-bus message process 610 as facilitated by message logic 206 of FIG. 2. In one embodiment, mobile process 508 may not be directly associated with I-bus master process 610, such as a mobile computing device (e.g., smartphone, tablet computer, etc.) may not be directly connected to an I-bus but that there may be a method or a sub-process to connect and input the process within the mobile computing device to or through, for example, GUI i-bus 612D.

In one embodiment, message logic 206 of FIG. 2 may further facilitate a particular message format that is appropriate for any given protocol that is being used and used. For example and in one embodiment, in case of I-bus messaging as used here, the I-bus message format may be used which consists of a small header and a message body. The message header may have a length field, a version field, a source field, a destination, and a message type. The message body may be a well-defined structure that is specific to the message type, depending on the status event. For example, a keyboard event may entail a different message format than a media status event.

FIG. 7 illustrates a database architecture 700 for facilitating an integrated navigation system. In one embodiment, database logic 208 of FIG. 2 may facilitate the implementation of the illustrated database architecture 700 and its use with regard to storing contents of and for the integrated UI (such as the integrated UI 420 of FIG. 4) and any multimedia metadata. In one embodiment, a relational database management system or an embedded database (e.g., Structured Query Language Lite (SQLite®)) that is used for local/client storage in application software (e.g., web browsers) may be used as the database architecture 700 for facilitating the integrated navigation system. For example and in one embodiment, an SQLite-based database 710 may be used to store and preserve fat content for the integrated UI as binary (or basic) large objects (BLOBs), while Uniform Resource Identifiers (URIs)/Uniform Resource Locators (URLs) of the content may be stored in tables. For example, database 710 may be used to store datasets relating to the integrated UI, including (1) menus content, (2) sub-menus content, (3) metadata for media, (4) icons (for menu items), and (5) lists of current media selections, etc. As illustrated, database 710 is in communication with processes 502, 506-510 via their corresponding SQL links 712A-712D. SQLite-based database 710 and database architecture 700 may be used because SQLite is regarded as relatively small and fast for embedded systems and might not have any need for any external protocol processes, such as in case of MySQL. In another embodiment, an Object-Oriented database model may be used or used instead of the relational database model. For example, since objects, such as Moving Picture Experts Group (MPEG) files, may be referred to, an object-oriented database management system (OODBM) may provide object persistence and offer performance improvements.

With regard to a UI navigation structure within the integrated navigation system, in one embodiment, the X/Y menu structure of the navigation UI can be easily changed, via customization logic 212 of FIG. 2, if the user wishes to adapt the integrated UI to his/her personal preferences. To have these settings and changes persist, the SQLite-based database 710 may be used not only to store general data and associated metadata, but also provide additional structure and solutions for storing the data that is relevant to the new settings so that the settings may persist.

Moreover, in one embodiment, two different processes may use the UI navigation data. For example, in this case, it may be used by the main integrated UI (e.g., the one that is displayed on the television) and also by a smaller or another version of the integrated UI that is provided on the user, mobile computing device, such as an interface for mobile process 508 (e.g., smartphone, tablet computer, etc.). In the case of mobile computing device, the user is able to navigate the media, menu, displays, etc., similar to those found on the television-based UI, and may in turn instruct the television to play the given media and display it in a particular manner.

Since the smartphone-based UI is able to access the local database files by linking in the main SQLite database 710, via its corresponding SQL link 712B, the user may use a smartphone to access local database files as a separate device/computer. For example, to accomplish this, a web server with a small Common Gateway Interface (CGI) script may be used to perform SQL queries to allow smartphones to access database tables and recreate a version of the integrated UI for display on display screens of smartphones.

With regard to media metadata, in one embodiment, an appropriate version of the integrated UI may be visible on a television screen as well as a mobile device (e.g., smartphone) screen, using media metadata for writing the synopsis of the details view for the selected item (e.g., cover art, a movie's synopsis, etc.). When a user via a UI provided through GUI 708 or a supplemental UI provided through a mobile computing device selects a television program, based on a media ID, media process 502 may, in turn, query database 710 for the media type and the media source location to fulfill the user selection/request. A remote control (e.g., a television remote control) may be unidirectional and unable to use database directly; however, in one embodiment, a remote control's various button code mappings (to standardized functions) 720 may be stored in the database. Further, unlike other processes 502, 506-510, it is through mapping 720 that the remote process, such as remote process 504 of FIG. 5, be linked to database 720.

Similarly, web process 506 (e.g., WebKit) may query database 710 in response to a user's request, such as for a bookmarked Uniform Resource Locator (URL) of a website, etc.

Figure 8:
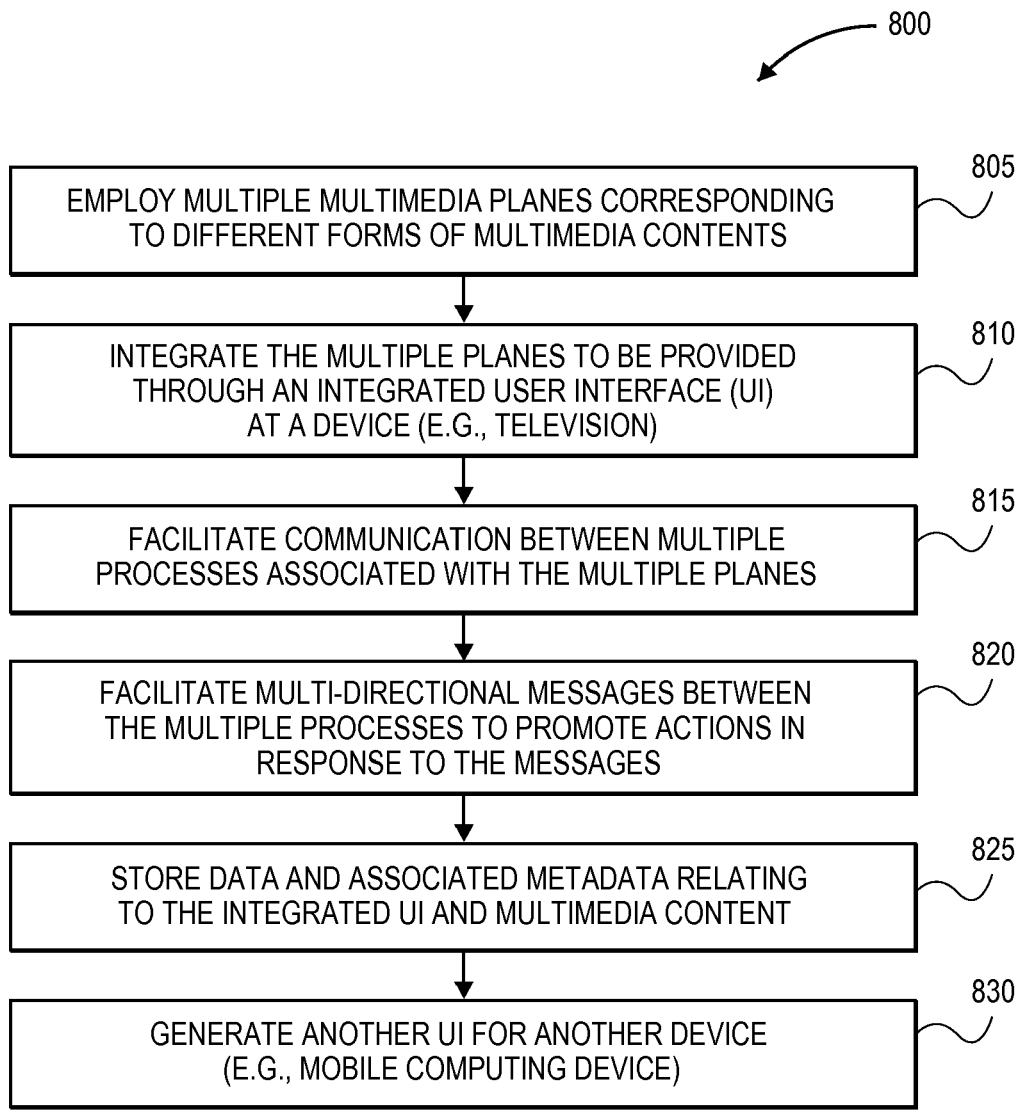
FIG. 8 illustrates a method for facilitating integrated navigation system according to one embodiment.

FIG. 8 illustrates a method for facilitating integrated navigation system according to one embodiment. Methods 800 may be performed by processing logic that may comprise hardware (e.g., circuitry, dedicated logic, programmable logic, etc.), software (such as instructions run on a processing device), or a combination thereof. In one embodiment, method 400 may be performed by integration mechanism 110 of FIG. 1. It is contemplated that processes 805-830 may not be performed in the exact order as illustrated here and that one or more of the processes 805-830 may be optional.

Method 800 begins at block 805 with using multiple multimedia viewing planes corresponding to different forms of multimedia content (e.g., television media stream, websites, etc.). At block 810, in one embodiment, the multiple multimedia planes are integrated into an integrated navigation system and provided via an integrated UI that is provided to a user through a media device (e.g., a television). The integrated UI may also be used to change settings (e.g., color, language, caption, user profile, etc.). At block 815, inter-process communication is facilitated between multiple processes (e.g., web process, GUI process, etc.) to facilitate the integrated navigation system. With inter-process communication, various processes can communicate with each other through the integrated UI as most users communicate (e.g., enter information, requests, changes, etc.) through the integrated UI they see on their display screen.

At block 820, multi-direction messaging is facilitated between the processes so one message from one or more processes (e.g., remote process, web process) may be forwarded on to the integrated UI to promote and perform an appropriate act (e.g., move up or down the screen, select a program, open a website, etc.) based on the communicated messages (e.g., press a key, move a cursor, etc.). At block 825, any content/data or relevant metadata associated with the integrated UI, the multimedia content that is being communicated and/or displayed, multiple processes, media device, etc., may be stored in a database from where the data and metadata can be communicated between multiple processes. At block 830, in one embodiment, another/second integrated UI is generated to be displayed on another/second media device (e.g., a mobile computing device, such as a smartphone, etc.). For example, the second UI at, for example, a smartphone may be used to communicate changes to the main integrated UI at, for example, a television to promote certain changes within the integrated navigation system.

FIGS. 9A, 9B, 9C and 9D illustrate embodiments of remote controls 920, 940, 960 that are configured to be used with an integrated navigation system. In one embodiment, remote control logic 210 of FIG. 2 facilitates remote controls 920, 940, 960 to control multiple media devices and services reliably, efficiently, and intuitively through an integrated UI (such as the integrated UI 420 of FIG. 4) within the integrated navigation system. In one embodiment, remote control logic or parts of it or simply another remote control-based logic/module, such as a device management module, may be incorporated into various consumer remote control products to facilitate an number of features of remote controls 920, 940, 960. In one embodiment, remote control logic and/or device management logic at a remote control 920, 940, 960 may allow for pointing and selecting of a media device (e.g., television, computer, etc.) that controls an on-screen interface in two dimensions (X-Y control) and receive clicks for selection of on-screen objects or actions. The device management logic further enables a remote control to work with an integrated On-Screen Navigation System in a flexible, user-friendly manner.

Referring to FIG. 9A, an embodiment of a physical push-button remote control 920 is illustrated as having standard numeric, direction and functional buttons, rear click capability, thumb scroll wheel 914A further supplemented by a touch pad 910A, onboard accelerometers and RF transmitter, and a couple of microphones 906A, 908A. FIG. 9B illustrates an embodiment of another physical push-button remote control 940 with a full QWERTY keyboard 914B and further having a set of noise cancelling microphones 906B, 908B, a speaker 904, and a touch pad 910B.

Referring now to FIG. 9C, it illustrates a mobile computing device 960 (e.g., a smartphone, a tablet computer, etc.) that comprises, in one embodiment, a software-emulated remote control device implemented, for example, by an Apple® iPhone® a mobile computing device running the Google® Android® operating system, or other similar computing device. In one embodiment, the mobile computing device 960 may include a more complex application with a functional secondary integrated UI that is similar to the integrated UI of another device, such as television. This novel technique allows the user to take advantage of the secondary UI at the mobile computing device 960 to use it as the main integrate UI or to make changes to the integrated navigation system. Mobile computing device 960 provides a touch pad emulator 930 and two microphones 906C, 908C.

In various embodiments, each of the remote control devices 920, 940, 960 may optionally include a capacitive touch sensor that allows scrolling and clicking for pointing and selecting in two dimensions 910A, 910B, accelerometers and other sensors that detect movement and provide pointing capability that supplements (or replaces) that of the touch pad, ergonomically laid out buttons that are intuitive to use, a keyboard that may be remapped from a full QWERTY layout in a horizontal orientation to a more traditional remote control layout in a vertical orientation, a thumb wheel that allows quick and intuitive scrolling through a list of options, a speaker to provide a variety of audible prompts, and an LCD display to provide channel information and other data that is better to be shown to the user on the remote control device than on the main television screen or display.

The use and operation of a remote control in a complex entertainment environment can be a difficult challenge since it can be awkward and cumbersome to look at the remote control and alternatively to a media device display screen (e.g., a television screen) and attempt to establish a mental map between the physical layout of the remote control and the media device's functions. To ease this process, in one embodiment, the pointing capability of remote controls 920, 940, 960 establishes a natural correspondence between the physical control interface and the virtual (e.g. on-screen) mapping of controlled functions of the media device. Further, advanced power management features are incorporated into each remote control 920, 940, 960 so that the increasing power demands associated with enhanced remote control capabilities are efficiently and wisely managed. For example and in one embodiment, the need for data and radio communications during idle states (e.g., when no user is detected near the remote control) are reduced while still keeping the remote control 920, 940, 960) available for use on-demand. Given that as any onboard power supply (e.g., battery capability) is limited, an inductive charging mechanism is provided to make charging as convenient as possible.

Figure 9D:
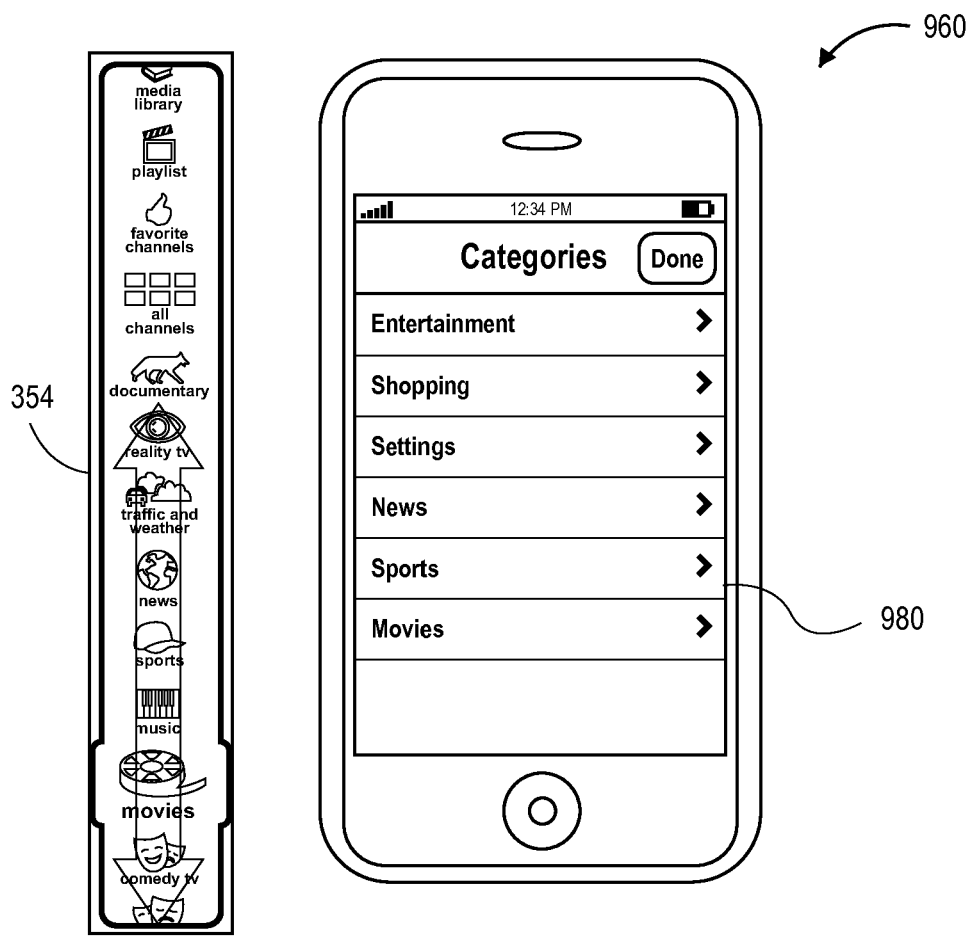

FIG. 9D illustrates an embodiment of populating a mobile device-based remote control 960 with categories 980 that parallel the category ribbon 354 of GUI view 350 of FIG. 3B. Using this feature, remote control 960 may use a web server and/or a client-initiated database queries to retrieve any media metadata and the corresponding navigation information (e.g., UI menus, filters, etc.) from a database (e.g., SQL database).

Figure 10:
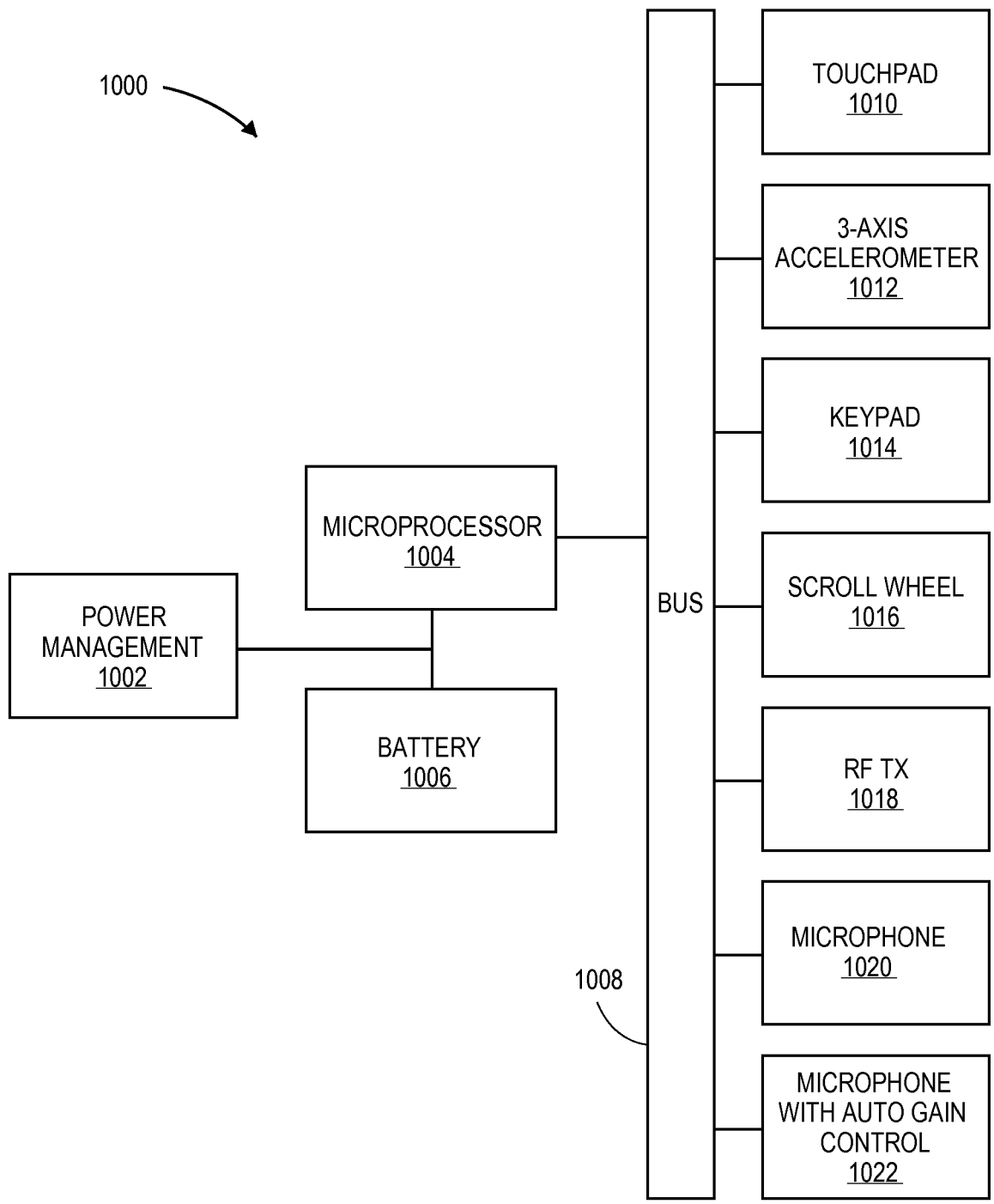
FIG. 10 illustrates an embodiment of a remote control system.
Figure 11:
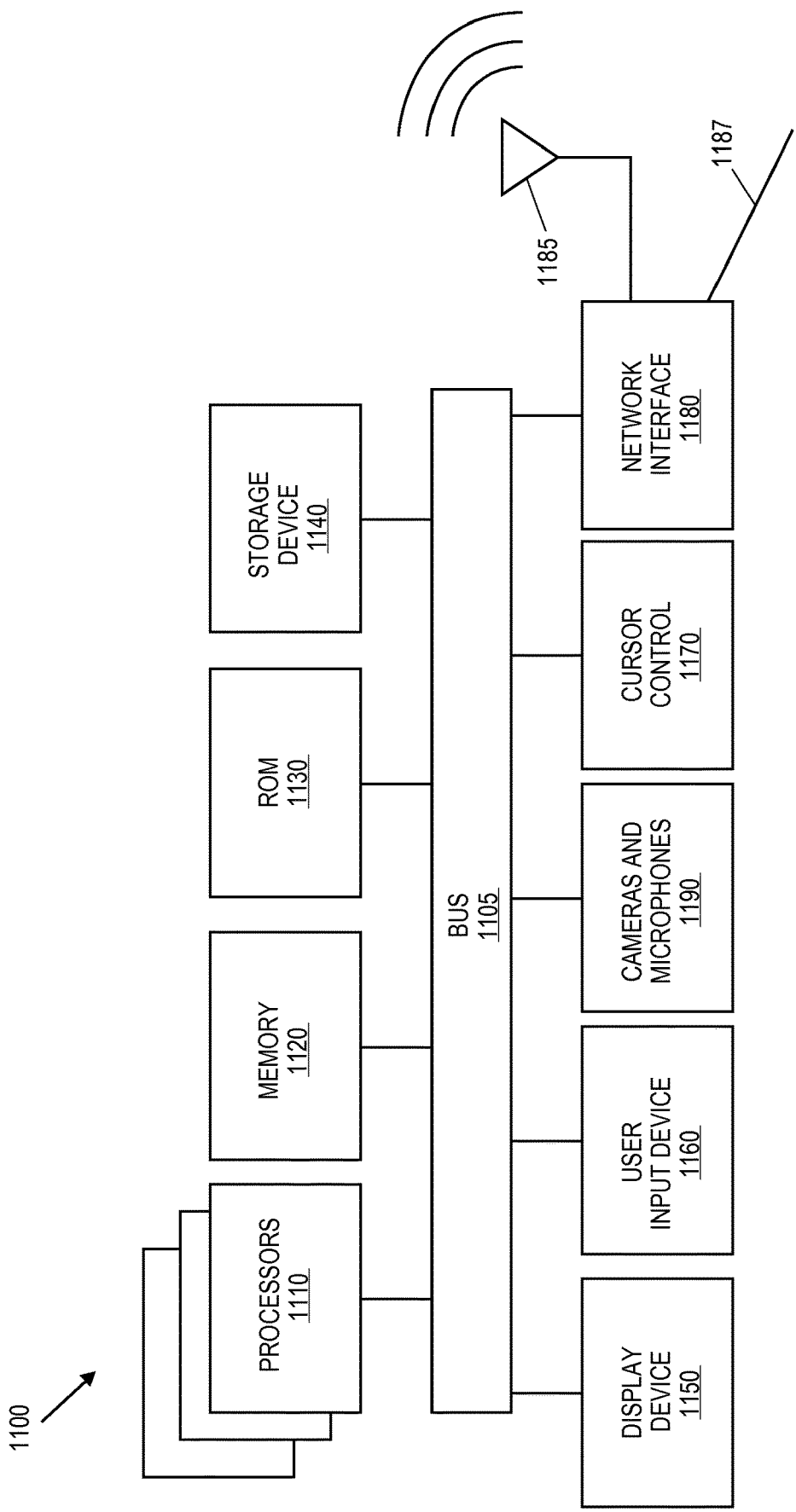
FIG. 11 is block diagram of a computer system suitable for implementing embodiments of the present disclosure according to one embodiment of the invention.

FIG. 10 illustrates an embodiment of a remote control system 1000. For brevity, any overlapping components of remote control system 1000 and media device 100 of FIG. 1 and/or computing device 1100 of FIG. 11 are not discussed here. As illustrated, the remote control system 1000 includes a bus 1008 (also referred to as a "link" or "interconnect") that is in communication with a touchpad 1010, a 3-axis accelerometer 1012 for user interface control (e.g., for displaying landscape or portrait views and gesture detection), a keypad 1014, a scroll or track wheel 1016, an RF transmitter 1018, a microphone 1020, and a microphone with an automatic gain control (AGC) 1022. The bus 1008 is further in communication with microprocessor 1004, a battery 1006, and a power management control 1002. It is contemplated that embodiments of the invention are not limited to the illustrated components of the remote control system 100 and that any number of new components may be added, and existing components may be removed or modified to add, remove or modify, respectively, any number and type of features.

FIG. 11 illustrates an embodiment of a computing system 1100. Computing system 1100 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 1100 includes bus 1105 (or a link, an interconnect, or another type of communication device or interface to communicate information) and processor 1110 coupled to bus 1105 that may process information. While computing system 1100 is illustrated with a single processor, electronic system 1100 and may include multiple processors and/or co-processors, such as one or more of central processors, graphics processors, and physics processors, etc. Computing system 1100 may further include random access memory (RAM) or other dynamic storage device 1120 (referred to as main memory), coupled to bus 1105 and may store information and instructions that may be executed by processor 1110. Main memory 1120 may also be used to store temporary variables or other intermediate information during execution of instructions by processor 1110.

Computing system 1100 may also include read only memory (ROM) and/or other storage device 1130 coupled to bus 1105 that may store static information and instructions for processor 1110. Date storage device 1140 may be coupled to bus 1105 to store information and instructions. Date storage device 1140, such as magnetic disk or optical disc and corresponding drive may be coupled to computing system 1100.

Computing system 1100 may also be coupled via bus 1105 to display device 1150, such as a cathode ray tube (CRT), liquid crystal display (LCD) or Organic Light Emitting Diode (OLED) array, to display information to a user. User input device 1160, including alphanumeric and other keys, may be coupled to bus 1105 to communicate information and command selections to processor 1110. Another type of user input device 1160 is cursor control 1170, such as a mouse, a trackball, or cursor direction keys to communicate direction information and command selections to processor 1110 and to control cursor movement on display 1150.

Camera and microphone arrays 1190 of computer system 1100 may be coupled to bus 1105 to observe gestures, record audio and video and to receive and transmit visual and audio commands.

Computing system 1100 may further include network interface(s) 1180 to provide access to a network, such as a local area network (LAN), wide area network (WAN), metropolitan area network (MAN), personal area network (PAN), Bluetooth, an intranet, the Internet, etc. Network interface(s) 1180 may include, for example, a wireless network interface having antenna 1185, which may represent one or more antenna(e). Network interface(s) 1180 may also include, for example, a wired network interface to communicate with remote devices via network cable 1187, which may be, for example, an Ethernet cable, a coaxial cable, a fiber optic cable, a serial cable, or a parallel cable.

Network interface(s) 1180 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 1180 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 1180 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 1100 may vary from implementation to implementation depending upon numerous factors, such as price constraints, performance requirements, technological improvements, or other circumstances. Examples of the electronic device or computer system 1100 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments. Specifics in the examples may be used anywhere in one or more embodiments. The various features of the different embodiments may be variously combined with some features included and others excluded to suit a variety of different applications. Some embodiments pertain to a method comprising using a plurality of multimedia planes corresponding to a plurality of multimedia content types, wherein the plurality of multimedia planes are integrated to be presented through an integrated user interface at a media processing device; selecting, via the integrated user interface, one or more content categories from a plurality of multimedia content categories; and presenting, via a multimedia plane of the plurality of multimedia planes, contents associated with the one or more selected content categories.

Embodiments include any of the above methods wherein the plurality of multimedia planes comprise one or more of a video viewing plane, a web content viewing plane, and a Graphical User Interface (GUI) graphics viewing plane.

Embodiments include any of the above methods further comprising blending the plurality of multimedia planes to provide a composite image embodying the integrated user interface.

Embodiments include any of the above methods further comprising facilitating multi-directional communication, via one or more communication channels, between two or more processes of a plurality of processes associated with two or more multimedia planes, wherein the plurality of processes generate the plurality of multimedia planes.

Embodiments include any of the above methods further comprising facilitating multi-directional messaging, via one or more message buses, between two or more processes associated with two or more multimedia planes of the plurality of multimedia planes.

Embodiments include any of the above methods further comprising facilitating storing in a database one or more of multimedia contents, user inputted contents, user interface datasets, and media metadata, wherein the database includes a Sequential Query Language (SQL)-based database or an Object-Oriented database.

Embodiments include any of the above methods further comprising content provided by a content provider or a user interface publisher, the content includes one or more of menu content, sub-menu content, menu icons, sub-menu icons, and a list of current media selections.

Embodiments include any of the above methods wherein the media metadata comprises media source locations, media types, media element identifications, media synopsis, and media cover art, wherein the media types include one or more of a Moving Picture Experts Group (MPEG) file on disk, an MPEG transport stream over a network, non-MPEG, and a webpage.

Embodiments include any of the above methods wherein presenting comprises displaying the contents via a display device coupled to the media processing device, wherein the media processing device includes one or more of a television or a computing system including a mobile computing device.

Embodiments include any of the above methods wherein selecting comprises receiving a control directive from a media control device including a remote control.

Embodiments include any of the above methods wherein the remote control comprise a plurality of features including one or more of a display screen, a touch pad, a touch pad emulator, a scroll or track wheel, one or more push buttons, a push button QWERTY keypad, a touch or emulator QWERTY keypad, a speaker, a microphone, and one or more noise cancelling microphones.

Embodiments include any of the above methods further comprising providing a supplemental integrated user interface via the remote control, wherein the supplemental integrated user interface is used to emulate and control the integrated user interface via the remote control.

In another embodiment, an apparatus comprises: a multimedia navigation planes integration mechanism having first logic to use a plurality of multimedia planes corresponding to a plurality of multimedia content types, wherein the plurality of multimedia planes are integrated to be presented through an integrated user interface at a media processing device; second logic to select, via the integrated user interface, one or more content categories from a plurality of multimedia content categories; and third logic to present, via a multimedia plane of the plurality of multimedia planes, contents associated with the one or more selected content categories.

Embodiments include the apparatus above wherein the plurality of multimedia planes comprise one or more of a video viewing plane, a web content viewing plane, and a Graphical User Interface (GUI) graphics viewing plane.

Embodiments include the apparatus above further comprising forth logic to blend the plurality of multimedia planes to provide a composite image embodying the integrated user interface.

Embodiments include the apparatus above further comprising fifth logic to facilitate multi-directional communication, via one or more communication channels, between two or more processes of a plurality of processes that generate two or more multimedia planes of the plurality of multimedia planes.

Embodiments include the apparatus above further comprising sixth logic to facilitate multi-directional messaging, via one or more message buses, between a plurality of processes that generated the plurality of multimedia planes.

Embodiments include the apparatus above further comprising seventh logic to facilitate storing in a database one or more of multimedia contents, user inputted contents, user interface datasets, and media metadata, wherein the database includes a Sequential Query Language (SQL)-based database or an Object-Oriented database.

Embodiments include the apparatus above further comprising content provided by a content provider or a user interface publisher, the content includes one or more of menu content, sub-menu content, menu icons, sub-menu icons, and a list of current media selections.

Embodiments include the apparatus above wherein the media metadata comprises media source locations, media types, media element identifications, media synopsis, and media cover art, wherein the media types include one or more of a Moving Picture Experts Group (MPEG) file on disk, an MPEG transport stream over a network, non-MPEG, and a webpage.

Embodiments include the apparatus above wherein the third logic is further to display the contents via a display device coupled to the media processing device, wherein the media processing device includes one or more of a television or a computing system including a mobile computing device.

Embodiments include the apparatus above wherein the second logic is further to receive a control directive from a media control device including a remote control.

Embodiments include the apparatus above wherein the remote control comprise a plurality of features including one or more of a display screen, a touch pad, a touch pad emulator, a scroll or track wheel, one or more push buttons, a push button QWERTY keypad, a touch or emulator QWERTY keypad, a speaker, a microphone, and one or more noise cancelling microphones.

Embodiments include the apparatus above further comprising eighth logic to provide a supplemental integrated user interface via the remote control, wherein the supplemental integrated user interface is used to emulate and control the integrated user interface via the remote control.

In another embodiment, a system comprises: a media processing device having a memory to store instructions, and a processing device to execute the instructions, wherein the instructions cause the processing device to use a plurality of multimedia planes corresponding to a plurality of multimedia content types, wherein the plurality of multimedia planes are integrated to be presented through an integrated user interface at a media processing device; select, via the integrated user interface, one or more content categories from a plurality of multimedia content categories; and present, via a multimedia plane of the plurality of multimedia planes, contents associated with the one or more selected content categories.

Embodiments include the system above wherein the plurality of multimedia planes comprise one or more of a video viewing plane, a web content viewing plane, and a Graphical User Interface (GUI) graphics viewing plane.

Embodiments include the system above wherein the processing device is further to blend the plurality of multimedia planes to provide a composite image embodying the integrated user interface.

Embodiments include the system above wherein the processing device is further to facilitate multi-directional communication, via one or more communication channels, between two or more processes of a plurality of processes that generate two or more multimedia planes of the plurality of multimedia planes.

Embodiments include the system above wherein the processing device is further to facilitate multi-directional messaging, via one or more message buses, between a plurality of processes that generated the plurality of multimedia planes.

Embodiments include the system above wherein the processing device is further to facilitate storing in a database one or more of multimedia contents, user inputted contents, user interface datasets, and media metadata, wherein the database includes a Sequential Query Language (SQL)-based database or an Object-Oriented database.

Embodiments include the system above further comprising content provided by a content provider or a user interface publisher, the content includes one or more of menu content, sub-menu content, menu icons, sub-menu icons, and a list of current media selections.

Embodiments include the system above wherein the media metadata comprises media source locations, media types, media element identifications, media synopsis, and media cover art, wherein the media types include one or more of a Moving Picture Experts Group (MPEG) file on disk, an MPEG transport stream over a network, non-MPEG, and a webpage.

Embodiments include the system above wherein the processing device is further to display the contents via a display device coupled to the media processing device, wherein the media processing device includes one or more of a television or a computing system including a mobile computing device.

Embodiments include the system above wherein the processing device is further to receive a control directive from a media control device including a remote control.

Embodiments include the system above wherein the remote control comprise a plurality of features including one or more of a display screen, a touch pad, a touch pad emulator, a scroll or track wheel, one or more push buttons, a push button QWERTY keypad, a touch or emulator QWERTY keypad, a speaker, a microphone, and one or more noise cancelling microphones.

Embodiments include the system above further comprising eighth logic to provide a supplemental integrated user interface via the remote control, wherein the supplemental integrated user interface is used to emulate and control the integrated user interface via the remote control.

In another embodiment, an apparatus comprises means for performing any one or more of the operations mentioned above.

In yet another embodiment, at least one machine-readable comprising a plurality of instructions that in response to being executed on a computing device, causes the computing device to carry out a method according to any one or more of the operations mentioned above.

In yet another embodiment, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method for presenting a plurality of multimedia planes on a media processing device having a display screen and having a plurality of processes, comprising:
   combining the plurality of multimedia planes into an integrated set of multimedia planes by blending the plurality of multimedia planes into a composite image to be presented through an integrated user interface at the media processing device, wherein the plurality of multimedia planes correspond to a plurality of content types including a first video content and one or more of a webpage content, a graphics content, an audio content, or a second video content, and wherein the one or more of the webpage content, the graphics content, the audio content, or the second video content does not overlap the first video content;
   in response to a user selection via the integrated user interface, presenting one or more multimedia content types from the plurality of content types, wherein the integrated user interface serves as a unified access point for presenting multimedia contents corresponding to the plurality of content types;
   facilitating interprocess multidirectional communication between a first process associated with a first multimedia plane and a second process associated with a second multimedia plane to determine a display of content on the first multimedia plane and a display of content on the second multimedia plane, the first multimedia plane and the second multimedia plane each assigned to different content types among the plurality of content types; and
   simultaneously displaying a category selection area, a media object selection area, an information panel, and an action panel to facilitate simultaneous rendering of two or more of the plurality of content types including an audio content, a video content, a graphics content, or a webpage content,
   wherein one or more of the integrated set of multimedia planes serve as one or more selection areas, the one or more selection areas to be displayed as running horizontally or vertically, and
   wherein the one or more selection areas include the category selection area listing categories associated with the multimedia contents, and the media object selection area listing media objects associated with the categories, wherein one or more of the media objects include two or more of a media content preview pane, a media content source identifier, a media content program time, a media content program progress indicator, and a media content program name, and wherein at least one of the category selection area and the media object selection area is located horizontally along a lower edge of the display screen.

2. The method as recited in claim 1, wherein the interprocess communication is via messaging.

3. The method as recited in claim 1, wherein the content types include at least one of web content, television programming, media streaming, multimedia streaming, video streams, navigation ribbon, category ribbon, information panel, action menu, media object ribbon, DVD-based media, name/symbol/logo/icon, and a channel guide.

4. The method as recited in claim 1,
wherein a first one of the one or more media objects includes the media content preview pane, the media content source identifier, the media content program name, and the media content program time; and
wherein a second one of the one or more media objects includes the media content preview pane, the media content source identifier, the media content program name, and the media content program progress indicator.

5. The method as recited in claim 1, wherein the interprocess communication comprises a master process that performs multidirectional messaging with each of the first process and the second process.

6. The method as recited in claim 5, wherein in the multidirectional messaging, the master process selects whether to forward received messages to the first process or to the second process based on the one or more multimedia content types selected by the user.

7. The method as recited in claim 6, wherein the messages selectively forwarded to the first process determine the display of the content on the first multimedia plane, and the messages selectively forwarded to the second process determine the display of the content on the second multimedia plane.

8. The method as recited in claim 5, wherein the first process and the second process communicate with the integrated user interface via the multidirectional messaging with the master process, and a third process associated with one or more of the multimedia planes communicates with the master process via multidirectional messaging with the integrated user interface.

9. At least one non-transitory computer readable storage medium for presenting a plurality of multimedia planes on a media processing device having a display screen and having a plurality of processes, the medium having instructions stored thereon, the instructions when executed on the media processing device cause the device to:
combine the plurality of multimedia planes into an integrated set of multimedia planes by blending the plurality of multimedia planes into a composite image to be presented through an integrated user interface at the media processing device, wherein the plurality of multimedia planes correspond to a plurality of content types including a first video content and one or more of a webpage content, a graphics content, an audio content, or a second video content, and wherein the one or more of the webpage content, the graphics content, the audio content, or the second video content does not overlap the first video content;
in response to a user selection via the integrated user interface, present one or more multimedia content types from the plurality of content types, wherein the integrated user interface serves as a unified access point for presenting multimedia contents corresponding to the plurality of content types;
facilitate interprocess multidirectional communication between a first process associated with a first multimedia plane and a second process associated with a second multimedia plane to determine a display of content on the first multimedia plane and a display of content on the second multimedia plane, the first multimedia plane and the second multimedia plane each assigned to different content types among the plurality of content types; and
simultaneously display a category selection area, a media object selection area, an information panel, and an action panel to facilitate simultaneous rendering of two or more of the plurality of content types including an audio content, a video content, a graphics content, or a webpage content,
wherein one or more of the integrated set of multimedia planes serve as one or more selection areas, the one or more selection areas to be displayed as running horizontally or vertically, and
wherein the one or more selection areas include the category selection area listing categories associated with the multimedia contents, and the media object selection area listing media objects associated with the categories, wherein one or more of the media objects include two or more of a media content preview pane, a media content source identifier, a media content program time, a media content program progress indicator, and a media content program name, and wherein at least one of the category selection area and the media object selection area is located horizontally along a lower edge of the display screen.

10. The medium as recited in claim 9, wherein the interprocess communication is via messaging.

11. The medium as recited in claim 9, wherein the content types include at least one of web content, television programming, media streaming, multimedia streaming, video streams, navigation ribbon, category ribbon, information panel, action menu, media object ribbon, DVD-based media, name/symbol/logo/icon, and a channel guide.

12. The medium as recited in claim 9,
wherein a first one of the one or more media objects includes the media content preview pane, the media content source identifier, the media content program name, and the media content program time; and
wherein a second one of the one or more media objects includes the media content preview pane, the media content source identifier, the media content program name, and the media content program progress indicator.

13. A media processing device having a display screen and having a plurality of processes, the device to present a plurality of multimedia planes, comprising:
an integrated user interface to combine the plurality of multimedia planes into an integrated set of multimedia planes by blending the plurality of multimedia planes into a composite image to be presented through an integrated user interface at the media processing device, wherein the plurality of multimedia planes correspond to a plurality of content types including a first video content and one or more of a webpage content, a graphics content, an audio content, or a second video content, and wherein the one or more of the webpage content, the graphics content, the audio content, or the second video content does not overlap the first video content;

presentation logic to, in response to a user selection via the integrated user interface,
  present one or more multimedia content types from the plurality of content types, wherein the integrated user interface serves as a unified access point for presenting multimedia contents corresponding to the plurality of content types; and
  simultaneously display a category selection area, a media object selection area, an information panel, and an action panel to facilitate simultaneous rendering of two or more of the plurality of content types including audio content, a video content, a graphics content, or a webpage content; and
communication logic to facilitate interprocess multidirectional communication between a first process associated with a first multimedia plane and a second process associated with a second multimedia plane to determine a display of content on the first multimedia plane and a display of content on the second multimedia plane, the first multimedia plane and the second multimedia plane each assigned to different content types among the plurality of content types,
wherein one or more of the integrated set of multimedia planes serve as one or more selection areas, the one or more selection areas to be displayed as running horizontally or vertically, and
wherein the one or more selection areas include the category selection area listing categories associated with the multimedia contents, and the media object selection area listing media objects associated with the categories, wherein one or more of the media objects include two or more of a media content preview pane, a media content source identifier, a media content program time, a media content program progress indicator, and a media content program name, and wherein at least one of the category selection area and the media object selection area is located horizontally along a lower edge of the display screen.

14. The media processing device as recited in claim 13, wherein the interprocess communication is via messaging.

15. The media processing device as recited in claim 13, wherein the content types include at least one of web content, television programming, media streaming, multimedia streaming, video streams, navigation ribbon, category ribbon, information panel, action menu, media object ribbon, DVD-based media, name/symbol/logo/icon, and a channel guide.

16. The media processing device as recited in claim 13,
  wherein a first one of the one or more media objects includes the media content preview pane, the media content source identifier, the media content program name, and the media content program time; and
  wherein a second one of the one or more media objects includes the media content preview pane, the media content source identifier, the media content program name, and the media content program progress indicator.

17. A method for presenting a plurality of multimedia planes on a media processing device having a display screen, comprising:
  combining the plurality of multimedia planes into an integrated set of multimedia planes by blending the plurality of multimedia planes into a composite image to be presented through an integrated user interface at the media processing device, wherein the plurality of multimedia planes correspond to a plurality of content types including a first video content and one or more of a webpage content, a graphics content, an audio content, or a second video content, and wherein the one or more of the webpage content, the graphics content, the audio content, or the second video content does not overlap the first video content;
  in response to a user selection via the integrated user interface, presenting one or more multimedia content types from the plurality of content types, wherein the integrated user interface serves as a unified access point for presenting multimedia contents corresponding to the plurality of content types;
  facilitating interprocess multidirectional communication between a master process and each of a first multimedia plane and a second multimedia plane to determine a display of content on each of the first multimedia plane and the second multimedia plane, the first multimedia plane and the second multimedia plane each assigned to different content types among the plurality of content types; and
  simultaneously displaying a category selection area, a media object selection area, an information panel, and an action panel to facilitate simultaneous rendering of two or more of the plurality of content types including an audio content, a video content, a graphics content, or a webpage content,
  wherein one or more of the integrated set of multimedia planes serve as one or more selection areas, the one or more selection areas to be displayed as running horizontally or vertically, and
  wherein the one or more selection areas include the category selection area listing categories associated with the multimedia contents, and the media object selection area listing media objects associated with the categories, wherein one or more of the media objects include two or more of a media content preview pane, a media content source identifier, a media content program time, a media content program progress indicator, and a media content program name, and wherein at least one of the category selection area and the media object selection area is located horizontally along a lower edge of the display screen.

18. The method as recited in claim 17, wherein the communication is via messaging.

19. The method as recited in claim 17, wherein the content types include at least one of web content, television programming, media streaming, multimedia streaming, video streams, navigation ribbon, category ribbon, information panel, action menu, media object ribbon, DVD-based media, name/symbol/logo/icon, and a channel guide.

20. The method as recited in claim 17,
  wherein a first one of the one or more media objects includes the media content preview pane, the media content source identifier, the media content program name, and the media content program time; and
  wherein a second one of the one or more media objects includes the media content preview pane, the media content source identifier, the media content program name, and the media content program progress indicator.

* * * * *